United States Patent [19]
Cheng

[11] Patent Number: 5,930,422
[45] Date of Patent: Jul. 27, 1999

[54] OPTICAL CIRCULATOR

[76] Inventor: Yihao Cheng, 36 Meadowbreeze Drive, Kanata, Ontario, Canada, K2M 2L6

[21] Appl. No.: 09/198,500

[22] Filed: Nov. 24, 1998

Related U.S. Application Data

[63] Continuation-in-part of application No. 08/826,699, Apr. 7, 1997, Pat. No. 5,880,081, and application No. 08/800,061, Feb. 14, 1997, Pat. No. 5,799,121.

[51] Int. Cl.$^6$ ........................................................ G02B 5/30
[52] U.S. Cl. ............................... 385/47; 385/11; 359/281; 359/484; 359/495; 359/497
[58] Field of Search .................................. 385/14, 15, 18, 385/11, 24, 37, 47; 359/281, 282, 485, 494, 495

[56] References Cited

U.S. PATENT DOCUMENTS

| | | | |
|---|---|---|---|
| 5,471,340 | 11/1995 | Cheng et al. | 359/281 |
| 5,689,359 | 11/1997 | Kurata et al. | 359/281 |
| 5,706,371 | 1/1998 | Pan | 385/11 |
| 5,768,005 | 6/1998 | Cheng et al. | 359/281 |

*Primary Examiner*—Rodney Bovernick
*Assistant Examiner*—Ellen E. Kang
*Attorney, Agent, or Firm*—Neil Teitelbaum & Associates

[57] ABSTRACT

A compact non-reciprocal optical waveguide-circulating device comprising three optical waveguides disposed along side one another at an input end adjacent a thin birefringent crystal to which they are optically coupled. The circulating device also includes at a distal end, a mirror for reflecting light backwards and providing a folded configuration. The device is capable of accepting a non-collimated beam of light that is launched from the input end through the birefringent crystal and rotating elements. By providing end faces at one end of the waveguides that are mode field expanded, light is effectively coupled between the waveguides and the adjacent crystal.

21 Claims, 4 Drawing Sheets

OPTICAL CIRCULATOR

This invention is a continuation-in-part of U.S. patent application Ser. No. 08/826,699 filed Apr. 7, 1997, is now U.S. Pat. No. 5,880,081. This application is a continuation-in-part U.S. patent application Ser. No. 08/800,061 filed Feb. 14, 1997, now issued U.S. Pat. No. 5,799,121.

FIELD OF THE INVENTION

The present invention relates to an optical circulator for use in optical communications.

BACKGROUND OF THE INVENTION

A practical way to double the bit carrying capacity of an existing unidirectional fiber optic communication link is by the use of optical circulators. An optical circulator is a passive, non-reciprocal device, which permits full duplex communication on a single fiber optic link. Thus, a typical fiber optic communication link operating on two fibers can be quickly and economically converted to a bi-directional, single fiber communication link by installing an optical circulator at each end of the link.

One of the major advantages of optical circulators over more traditional 3 dB couplers is that the loss penalty is much lower. Using a 3 dB coupler at each end of a fiber link, there is an insertion loss of at least 6 dB. For connections that operate near their detection limits, this additional 6-dB loss could make bidirectional communication impracticable.

In a real optical circulator insertion loss and cross-talk as well as simplicity and cost are important considerations. Insertion loss is the difference in power between light launched into the optical circulator and the power that exits the device. Insertion loss is largely due to absorption of light and to coupling loss.

Prior art optical circulators are described in U.S. Pat. No. 4,650,289, issued to Kuwahara; U.S. Pat. No. 4,464,022, issued to Emkey; and in U.S. Pat. No. 4,859,014, issued to Schmitt et al. However, optical circulators made as described in these references relatively costly due to the large size of optical components required. For example, optical circulators generally require collimated beams, or lensing that will achieve collimation. However, a typical collimated beam in prior art circulators has a beam diameter of ~350 $\mu$m, and when a beam is split into two beams having two polarization states, components such as birefringent crystals are required that are sized to accept beams of such diameters.

One such optical circulator where separate lenses are required is described by the applicant, Cheng, in U.S. Pat. No. 5,471,340. Here three sequential ports are described as being arranged in series such that light input into a first GRIN lens is directed to a second GRIN lens, and light input into the second GRIN lens is directed to a third GRIN lens. Aside from the obvious drawback of this device being quite large in size due to the diameter of the beams provided by the GRIN lenses, the birefringent crystals must be large, and sized to accept these large beams. In fact it is estimated that the cost of materials of an optical circulator such as Cheng's wherein light is collimated at the input of the device, is approximately 50 times the cost of the materials required for the device in accordance with this invention. Hence there is a significant advantage in both the small size and lower cost associated with the device of this invention.

Furthermore, there are other advantages that may be viewed as quite unexpected. The device in the applicant's earlier U.S. Pat. No. 5,471,340 requires for each lens to be individually adjusted to achieve optimum coupling. Furthermore, each of the three lenses must be affixed to the rutile crystal it is coupled with. In the instant invention, a single fibre tube housing three preset optical fibres is affixed to a birefringent crystal, and tuning or adjustment for optimum coupling can be achieved conveniently by, aligning port 1 to 2 and then ensuring that the beam shift direction of the second rutile crystal is parallel to the line extending through the fibre array. In this manner all the ports automatically align.

It is also an object of the invention to provide a device that has lower insertion loss and cross-talk as well as simplicity in the optical circulator. Although some prior art devices use a folded configuration, this invention provides a folded configuration that only requires a single lens and small birefringent crystals and other optical components. Aside from reducing the size of the device considerably which has a significant commercial advantage, the cost is correspondingly reduced.

A more recent prior art optical circulator that uses birefringent crystals in contact with other elements such as polarization rotators, is U.S. Pat. No. 5,204,771 issued Apr. 20, 1993 in the name of Koga. Although this invention appears to perform its intended function adequately, Koga's configuration results in a large device compared with the folded configuration of the present invention. Furthermore, Koga requires large components in contrast to this invention.

It is therefore an object of the invention, to overcome many of the limitations of known prior art devices.

It is a further object of the invention to provide a compact optical circulator that is of a folded configuration.

SUMMARY OF THE INVENTION

In accordance with this invention, a non-reciprocal optical waveguide circulating device is provided, comprising a first and second optical waveguide coupled by a common first optical path such that light launched into the first optical waveguide is directed to the second optical waveguide, respective ends of the first and second optical waveguides being at a same first end of the device;

a third optical waveguide at the first end of the device having an end substantially adjacent to one of the ends of the first and second optical waveguides, said third optical waveguide coupled by a second common optical path with the second optical waveguide such that light launched into the second optical waveguide is directed to the third optical waveguide;

at least partially reflective means at or about another end of the device for directing light launched into the first optical waveguide toward the second optical waveguide, and for directing light launched into the second optical waveguide to the third optical waveguide;

a lens disposed in the first and second optical paths between the reflective means and the waveguides, the lens sized to receive and pass light launched into the first optical waveguide to the reflective means and to pass light launched into second optical waveguide to the reflective means, and further, to receive and pass light from the reflective means to one of the second and third optical waveguides; and, means for steering and rotating light launched into the device in a polarization dependent manner such that light launched into the first optical waveguide is separated into two orthogonally polarized beams which are rotated and combined along the first optical path before being circulated to the second optical waveguide, and such that light launched into the second optical waveguide is separated into two orthogonally polarized beams which are rotated, shifted and combined along the second optical path before being circulated to the third optical waveguide, said means for steering and rotating light including means for substantially preventing light launched into the first optical waveguide from circulating to the third optical waveguide, and for substantially preventing light launched into the second optical waveguide from circulating to the first optical waveguide.

In accordance with the invention an optical circulator is provided comprising a first and second optical port coupled by a common first optical path such that light launched into the first optical port is directed to the second optical port, said ports being at a same first end of the device;

a third optical port at the first end of the device having an end and being coupled by a second common optical path with the second optical port such that light launched into the second optical port is directed to the third optical port;

at least partially reflective means at or about another end of the device for directing light launched into the first optical port toward the second optical port, and for directing light launched into the second optical port to the third optical port;

a lens disposed in both the first and second optical paths between the reflective means and the ports, the lens sized to receive and pass light launched into the first optical port to the reflective means and to pass light launched into second optical port to the reflective means, and further, to receive and pass light from the reflective means to one of the second and third optical port; and, means for steering and rotating light launched into the device in a polarization dependent manner such that light launched into the first optical port is separated into two orthogonally polarized beams that are rotated and combined along the first optical path before being circulated to the second optical port, and such that light launched into the second optical port is separated into two orthogonally polarized beams which are rotated, shifted and combined along the second optical path before being circulated to the third optical port.

Advantageously, the circulator in accordance with an embodiment of this invention allows a non-collimated beam to be launched through its beam splitting, rotating and shifting components, thereby lessening the requirement for standard large components. This considerably reduces the cost of manufacturing the device.

Advantageously, the circulator in accordance with another embodiment of this invention allows a substantially collimated beam having a very small diameter to be launched through its beam splitting, rotating and shifting components, thereby lessening the requirement for standard large components. This considerably reduces the cost of manufacturing the device.

BRIEF DESCRIPTION OF THE DRAWINGS

Exemplary embodiments of the invention will now be described in conjunction with the drawings in which.

DETAILED DESCRIPTION

Figure 1:
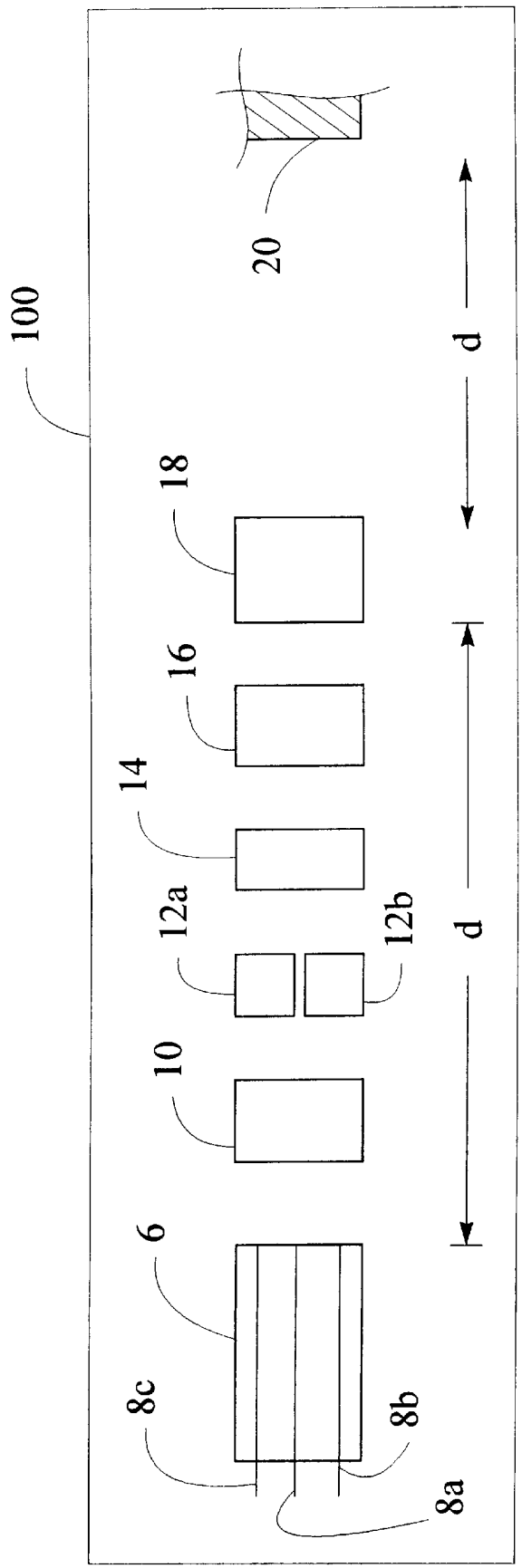
FIG. 1 is a schematic view showing a first embodiment of an optical circulator of the present invention.

The first embodiment of the optical circulator of this invention is described with reference to FIGS. 1, 1a, 2a and 2b.

Referring now to the first embodiment, a three-port optical circulator 100 is shown in accordance with the invention. Three optical fibres 8a, 8b, and 8c serving as ports 1, 2 and 3 respectively are disposed along side one another having substantially parallel longitudinal axes within an optical fibre. A thin block of birefringent material in the form of a birefringent crystal plate 10 having a dimension of approximately 2 mm×2 mm is disposed adjacent an inward end face of the fibre tube 6 to receive light from ports 1 and 2 and to provide light to ports 2 and 3 respectively. Preferably, end faces of the optical fibres at the inward end face of the fibre tube adjacent a crystal plate 10, have mode field expanded cores (and consequently a small numerical aperture), such as thermally expanded core (TEC) optical fibers to enhance coupling and also to reduce the size of the birefringent crystal necessary for separating the two polarizations. Numerical aperture (NA) or acceptance angle of an optical fibre, is inversely proportional to the square root of the core diameter of an optical fibre. A consequence of a larger NA is a larger angular divergence of an output beam exiting. One way of providing an optical fibre that has a small NA or acceptance angle is to expand the core of the fibre by heating. A conventional beam expanding fiber is disclosed in a reference entitled "Beam Expanding Fiber Using Thermal Diffusion of the Dopant" in Journal of Lightwave Technology. Vol. 8, No. 8 August 1990. The beam expanding fiber of the above reference has a core whose index of refraction is determined by the dopant e.g., Ge, that is thermally diffused so that a spot size of the fundamental mode, which corresponds to "mode-field diameter of the optical fiber", is partially expanded. Producing an optical fibre having a small NA can also be achieved by doping the fibre such that the cladding and the core have a small difference in refractive index.

Since this embodiment of optical circulator in accordance with this invention is not dependent upon having a collimated beam of light for its circulating operation, fibres having a small acceptance angle at one end are provided as input output ports to ensure adequate coupling of light to and from adjacent optical components. As the light exiting and entering the optical fiber from the birefringent crystal 10 is uncollimated and hence diverging/converging, by providing fibre ends for receiving the light, having a small acceptance angle, the size and thus the cost of the birefringent crystal required is reduced considerably. For example, in the embodiment of the invention described, a short birefringent crystal 10 can be used and adequate separation of two polarized output beams is realized. The input fibres adjacent the crystal each have a small numerical aperture or acceptance angle of 0.03 and a core diameter of 35 μm at their end face adjacent the crystal.

Figure 1A:
FIG. 1a is a view in cross-section of 4 waveplates in accordance with the embodiment shown in FIG. 1.
Figure 4:
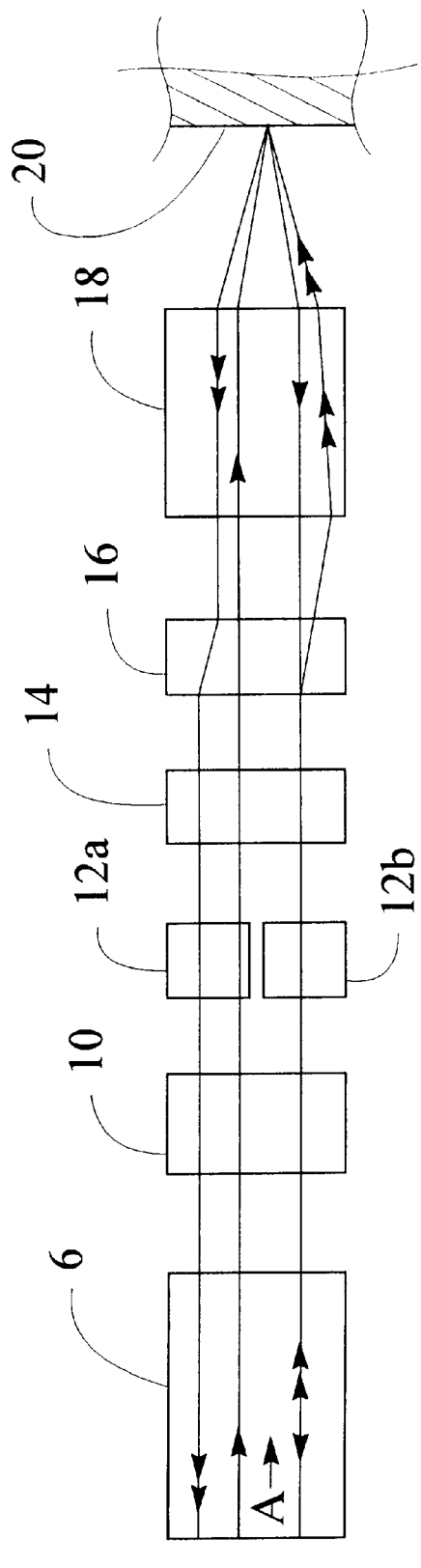
FIG. 4 is a schematic view of the circulator in accordance with this invention showing the light path from one port to another; and, FIGS. 5a and 5b are top and side views respectively of an alternative embodiment of the invention wherein the four quarter waveplates of FIG. 1 are not required.

As can be seen in FIGS. 1 and 1*a* four half waveplates 12*a*, 12*b*, 12*c*, and 12*d*, and a Faraday rotating element 14 are disposed between the thin birefringent crystal plate 10 and a second birefringent crystal plate 16 which primarily serves as a means of shifting a light beam from the second port to be incident upon a mirror 20 so that it reflects backward to its target location of the third port. This is illustrated in FIG. 4. Most importantly, the birefringent crystal is of a thickness to provide a total beam shift equal to the fibre separation at the input ports of the first and third ports 8*a* and 8*c*.

A lens preferably in the form of a GRIN lens 18 is disposed between the Faraday rotator and a reflective means in the form of the mirror 20. In order to achieve optimum coupling of light between sequential circulating ports, the optical path length between the output end face of the lens 18 and the mirror 20 is approximately the same as the optical path length between the input end face of the lens 18 and the second end face of the fibre tube 6. It should be noted, that this is contrary to conventional use GRIN lenses which are typically used in applications where they are used to provide a collimating beam, or are used oppositely to focus a collimating beam to a focused beam for coupling directly to a waveguide such as an optical fibre. $YVO_4$, Calcite or rutile crystals are preferably used for the above crystal plates 10 and 16. The non-reciprocal rotator 14 is preferably a Faraday rotating element using a Y.I.G crystal or Bi-added thin film crystals. The composition of the Bi-added thin film crystal includes a combination of, for example, $(YbTbBi)_3Fe_5O_{12}$ and $(GdBi)_3(GeAlGa)_5O_{12}$, or of Y.I.G. and $Y_{3-x}Bi_xFe_5O_{12}$.

Figure 2A:
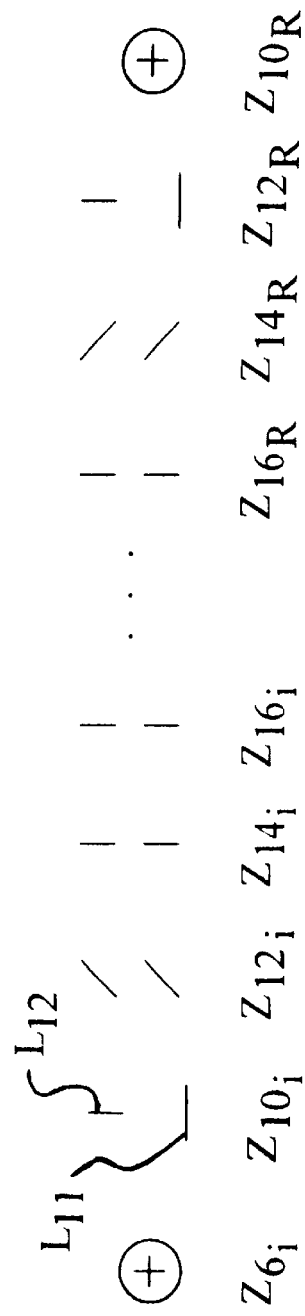
FIG. 2a is a diagrammatic view showing the light at different interfaces of the device of FIG. 1 from ports 1 to 2.
Figure 2B:
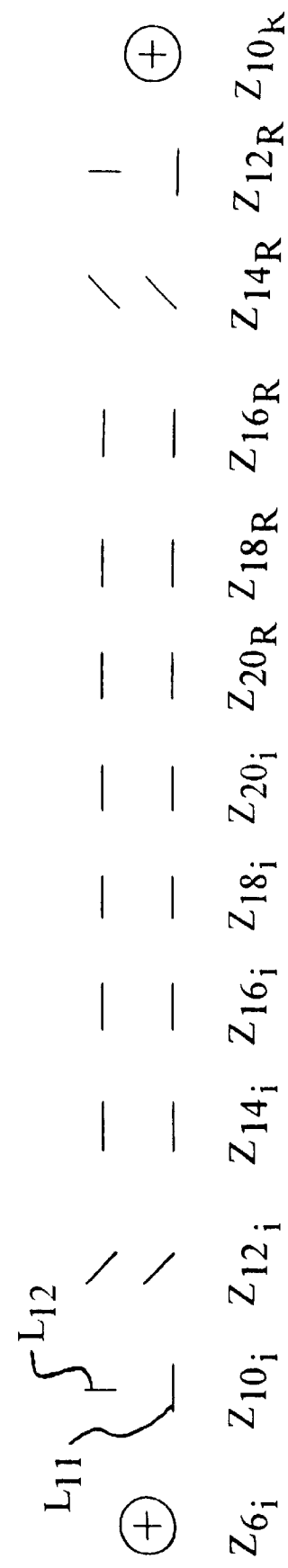
FIG. 2b is a diagrammatic view showing the light at different interfaces of the device of FIG. 1 from ports 2 to 3.

The operation of the circulator of FIG. 1 can be understood in conjunction with FIG. 4 which shows polarized light in a path A from port 1 to port 2, and from port 2 to port 3 respectively;

Next the operation of the optical circulator is explained. FIG. 2*a* is a view of polarized light A going from the light incoming and outgoing port 1 to the light incoming and outgoing port 2 as viewed from the side of the incoming light. (the side of the incoming and outgoing port 1). States $Z10_i$, $Z12_i$, $Z14_i$ through $Z20i$ are indicated and coincide with end faces 10, 12 through 20 in FIG. 2*a*, traveling along an axis in a direction from port 1 to the mirror 20. States $Z20_r$, $Z18_r$, $Z16_r$ through $Z10r$ are indicated and coincide with end faces 20, 18 through 10 in FIG. 2*a*, traveling along a Z-axis in a direction from the mirror 20 to the port 2. Light injected from the light incoming and outgoing port 1, is in a state Z10 and is separated into light L11 and light L12 on an X-Y plane by a first double refraction crystal plate 10. The light L11 is ordinary light (O-ray) relative to the first double refraction crystal plate 10 and light L12 is the extraordinary (E-ray). The light is polarized at right angles as shown by Z10. The electric field vibration of light L11 and light L12 which are perpendicular to each other, proceed in the same direction as a result of the light L11 and L12 passing through the half wave plate 12*a* and 12*c*. The state of the polarization of the light exiting the plate 12 at this time is shown by Z12; L11 and L12 having been rotated 45 degrees by plate 12. State Z14 shows the light as being rotated by another 45 degrees by the Faraday rotating element 14. The L11 and L12 now oriented along a same axis orthogonal to the birefringent crystal 16 pass through it and the lens adjacent to it, unchanged. Thus states Z16, Z18, and Z20 for this light are identical and the polarization of light is not altered by elements 16, 18, and 20.

The polarization of the light L11 and L12 is unchanged as it is reflected from the mirror 20, propagates back through to lens 18, and through the birefringent crystal 16 as shown by states $Z20_r$, $Z18_r$, $Z16_r$. However, as the light travels through the non-reciprocal Faraday rotating element 14 it is rotated (state $Z14_r$). Subsequently, as the light is passed through the rotating element 12*c* it is rotated by 45 degrees as shown by state $Z12_R$; and finally, the beams of light L11 and L12 being combined at port 2 by the crystal plate 10.

As light propagates from port 2 to port 3, it is first divided into two orthogonal rays by the birefringent crystal 10, as was the case for light travelling from port 1 to port 2. However, the waveplate 12*b* and 12*d* oriented oppositely from waveplate 12*a* and 12*c*, rotates the light L11 and L12 45 degrees in a counter clockwise direction as is shown by state $Z12_i$ (as opposed to the clockwise direction from waveplate 12*a*). After this light passes the Faraday rotator 14, indicated by state $Z14_i$, the beams having a same polarization (E-rays) are shifted by the birefringent crystal 16 thereby changing the angle at which they are incident upon the mirror 20. Conveniently, this directs the beam to port 3 via reflection from the mirror 20. On the return path the light is further shifted by the birefringent crystal 16, however its polarization states are not changed while traversing elements 16, 18 and 20.

In FIG. 1 the optical fibres 8*a*, 8*b*, and 8*c* are shown and define ports 1, 2, and 3 respectively. One requirement is that ports 1, and 3, and any other odd number ports in an n-port device be on one side of a line extending along the optical axis of the lens 18 and that even number ports 2, and any other even ports be on the other side of the optical axis. In this manner light will be directed through the GRIN lens from an odd number port such as port 1, to port 2 on an opposite side of the GRIN lens, and light launched into port 2 will pass to port 3 on the other side of the GRIN lens from port 2.

Figure 3:
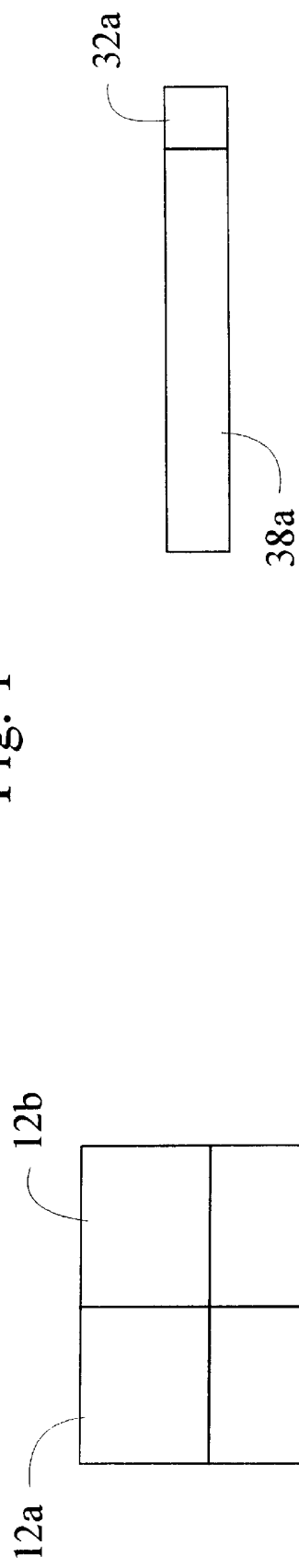
FIG. 3 is an enlarged broken away view of a portion of an optical fiber tube holding a lensed optical fibre to reduce the divergence of the beam and enhance coupling.

Turning now to FIG. 3, an alternative embodiment of the invention is partially shown, wherein very small collimating graded index (GRIN) lenses 32*a*, 32*b*, (not shown) and 32*c* (not shown) are coupled to inwardly facing end faces of optical fibers 38*a*, 38*b* (not shown), and 38*c* (not shown) respectively. GRIN lenses are one of the more ubiquitous building blocks used in the design and manufacture of optical components. Lenses of this type are produced under the trade name "SELFOC"; the mark is registered in Japan and owned by the Nippon Sheet and Glass Co. Ltd. The GRIN lenses used in this embodiment are extremely small, having a diameter of approximately, 500 μm and collimate the light exiting the ports. The circulator as shown in FIG. 3 otherwise functions in the same manner as the circulator of FIG. 1

FIG. 4 shows the direction of the first optical path as light launched into port 1 is circulated to port 2. A line having a single arrow indicates this light. Double arrows are used to indicate light launched into port 2 being circulated to port 3, the second optical path. Due to the fact that the light incident upon the crystal 16 consists of E-rays, the light is shifted and consequently, is directed away from the first optical path traveling from port 1 to port 2, and is directed to port 3. In contrast, the O-ray incident upon the same crystal 16 was not shifted but is passed through the crystal unaffected, when light was launched into port 1 circulating to port 2.

In both of the embodiments of the invention described heretofore, a relatively small beam is launched through the birefringent crystal, from one port to another. The beam may or may not be collimated. Conveniently, TEC fibre can be used wherein mode field expanded ends provide sufficient coupling of light between the end face of the fibre and the crystal 10.

Figure 5A:
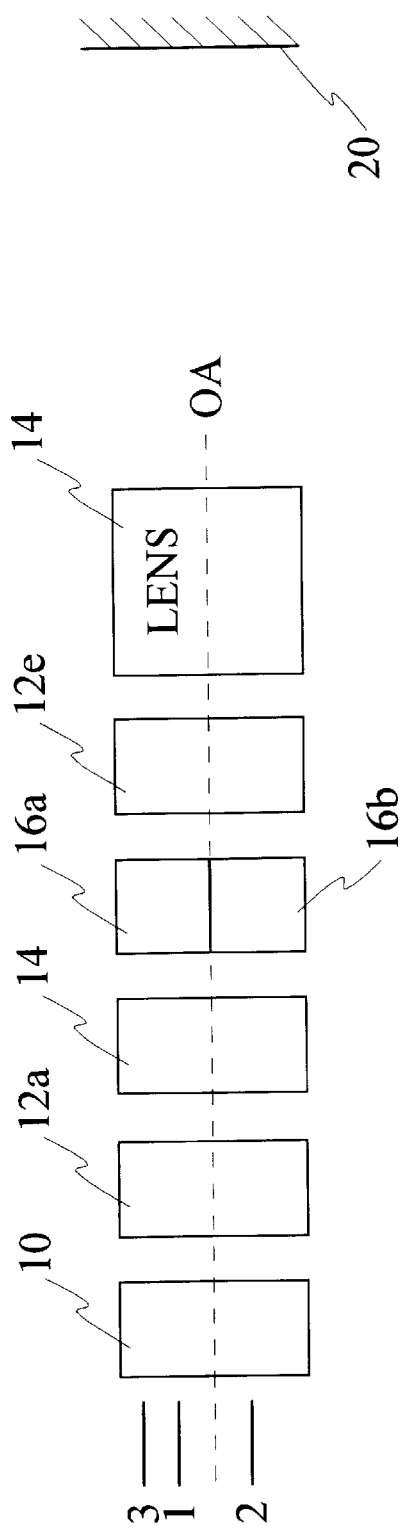
Figure 5B:
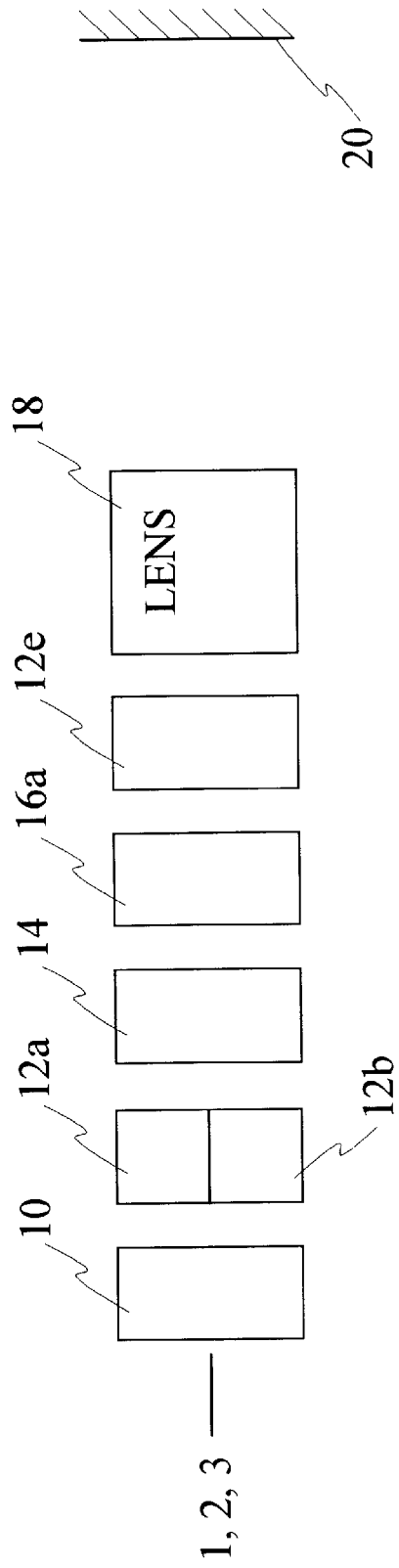

The embodiment shown in FIGS. 1 and 1*a* can be modified in such a manner as to provide an alternative to using four waveplates at the input end of the device. FIGS. 5*a* and 5*b* depict this alternative embodiment. Referrring now to FIGS. 5*a* and 5*b*, the circuit is similar in many respects to FIG. 1, however, the four waveplates 12*a*, 12*b*, 12*c*, and 12*d* have been replaced with two larger waveplates 12*a* and 12*b*. Furthermore, the crystal 16 shown in FIG. 1 has been split into two crystals 16*a* and 16*b*. In order for circulation to occur from port 1 to 2 and 2 to 3 another beam rotating means has been added between the beam shifting means 16*a* and 16*b* and the mirror 20, in the form of a waveplate 12*e*. Of course other rotating means could be provided as a substitute for the waveplate 12*e*. In this embodiment, as with others disclosed heretofore, an in accordance with a preferred embodiment of the invention, the distance from the mirror to the nearest end face of the lens 18 is substantially the same as the distance from the ports 1, 2 and 3 to the other end face of the lens. This ensures optimum coupling of light from one port to another.

Of course, numerous other embodiments may be envisaged, without departing from the spirit and scope of the invention; for example, additional ports can be provided and instead of using four half waveplates as has been disclosed, four Faraday rotators can be used.

What is claimed is:

1. A non-reciprocal optical circulator comprising a first and second optical waveguide coupled by a common first optical path such that light launched into the first optical waveguide is directed to the second optical waveguide, respective ends of the first and second optical waveguides being at a same first end of the device;

a third optical waveguide at the first end of the device having an end substantially adjacent to one of the ends of the first and second optical waveguides, said third optical waveguide coupled by a second common optical path with the second optical waveguide such that light launched into the second optical waveguide is directed to the third optical waveguide;

polarization beam splitting or combining means optically coupled to the first, second and third optical waveguides for splitting an input beam into two orthogonal polarized beams or for combing two orthogonal polarized beams into a single beam of light;

at least partially reflective means at or about another end of the device for directing light launched into the first optical waveguide toward the second optical waveguide, and for directing light launched into the second optical waveguide to the third optical waveguide;

a lens disposed in the first and second optical paths between the reflective means and the waveguides, the lens sized to receive and pass light launched into the first optical waveguide to the reflective means and to pass light launched into second optical waveguide to the reflective means, and further, to receive and pass light from the reflective means to one of the second and third optical waveguides; and, an optical circuit comprising a polarization rotating means and a beam shifting means, for rotating the polarization of light and steering light launched into the device in a polarization dependent manner such that light launched into the first optical waveguide is separated into two orthogonally polarized beams which are rotated and combined along the first optical path before being circulated to the second optical waveguide, and such that light launched into the second optical waveguide is separated into two orthogonally polarized beams which are rotated and combined along the second optical path before being circulated to the third optical waveguide, said optical circuit for substantially preventing light launched into the first optical waveguide from circulating to the third optical waveguide, and for substantially preventing light launched into the second optical waveguide from circulating to the first optical waveguide, light launched into one of the ports, destined for another of the ports passing through the optical circuit for rotating light and steering light being substantially uncollimated as it passes through the optical circuit, wherein the first, second and third waveguides define three sequential ports, respectively, the first and second waveguides defining a first pair of sequential ports, the second and third waveguide defining a second pair of sequential ports, each port in each pair of sequential ports being disposed on opposite sides of a line extending along the optical axis of the lens.

2. A non-reciprocal optical circulator as defined in claim 1, wherein the beam shifting means is of a thickness to provide a total beam shift equal to the fibre separation at the input ports of the first and third ports.

3. A non-reciprocal optical circulator as defined in claim 2, wherein the lens is a GRIN lens.

4. A non-reciprocal optical circulator as defined in claim 2, wherein four polarization rotators are disposed between the polarization beam splitting or combining means and the beam shifting means.

5. A non-reciprocal optical circulator as defined in claim 2, wherein the beam shifting means is comprised of two beam splitting crystals.

6. A non-reciprocal optical circulator as defined in claim 2, wherein four polarization rotators are disposed between the polarization beam splitting or combining means and the beam shifting means, or the beam shifting means is comprised of two beam splitting crystals.

7. A non-reciprocal optical circulator as defined in claim 2, wherein the ends of the waveguides have expanded mode fields to provide a beam having an acceptance angle less than the beam separation angle of the birefringent crystal.

8. A non-reciprocal optical circulator as defined in claim 1, wherein
   a) four polarization rotators are disposed between the polarization beam splitting or combining means and the beam shifting means, or
   b) the beam shifting means is comprised of two beam splitting crystals.

9. A non-reciprocal optical circulator as defined in claim 1, wherein an optical path length between a waveguide end face and the lens, is approximately the same as the optical path length between an end face of the lens and the reflective means, said lens for providing substantially collimated light to the reflective means.

10. A non-reciprocal optical circulator as defined in claim 9, wherein the reflective means is a substantially reflective mirror.

11. A non-reciprocal optical circulator as defined in claim 10, wherein the ends of the waveguides have expanded mode fields to provide a beam having an acceptance angle less than the beam separation angle of the polarization beam splitting or combining means.

12. A non-reciprocal optical circulator as defined in claim 11 wherein the beam splitting and combining means is a birefringent crystal.

13. A non-reciprocal optical circulator as defined in claim 1, wherein the steering circuit comprising a beam shifting means being of a thickness to provide a total beam shift equal to the fibre separation at the input ports of the first and third ports.

14. A non-reciprocal optical circulator as defined in claim 1 wherein the steering circuit comprises polarization-rotating means for rotating light sandwiched between first and second birefringent crystals.

15. A non-reciprocal optical circulator as defined in claim 14 wherein the steering circuit is between the lens and waveguides.

16. A non-reciprocal optical circulator as defined in claim 15 wherein polarization-rotating means comprises waveplate means and Faraday rotating means.

17. A non-reciprocal optical circulator as defined in claim 1, wherein the lens is disposed between the reflective means and the steering circuit.

18. A non-reciprocal optical circulator as defined in claim 1, wherein the lens is a single lens and wherein the only lens provided between the steering circuit and the reflective means is said single lens.

19. A non-reciprocal optical circulator as defined in claim 18, wherein an optical path length between a port and the single lens, is approximately the same as the optical path length between an end face of the lens and the reflective means, said lens for providing substantially collimated light to the reflective means.

20. An optical circulator comprising a first and second optical port coupled by a common first optical path such that light launched into the first optical port is directed to the second optical port, said ports being at a same first end of the device;

a third optical port at the first end of the device having an end and being coupled by a second common optical path with the second optical port such that light launched into the second optical port is directed to the third optical port;

polarization beam splitting or combining means optically coupled to the first, second and third optical ports for splitting an input beam into two orthogonal polarized beams or for combing two orthogonal polarized beams into a single beam of light;

at least partially reflective means at or about another end of the device for directing light launched into the first optical port toward the second optical port, and for directing light launched into the second optical port to the third optical port;

a lens disposed in both the first and second optical paths between the reflective means and the ports, the lens sized to receive and pass light launched into the first optical port to the reflective means and to pass light launched into second optical port to the reflective means, and further, to receive and pass light from the reflective means to one of the second and third optical port; and, a steering circuit for steering and rotating light launched into the device in a polarization dependent manner such that light launched into the first optical port is separated into two orthogonally polarized beams that are rotated and combined along the first optical path before being circulated to the second optical port, and such that light launched into the second optical port is separated into two orthogonally polarized beams which are rotated, and combined along the second optical path before being circulated to the third optical port, wherein light launched into the circulator and passing through the means for steering and rotating light passes through said means substantially uncollimated, wherein the first, second and third optical ports define three sequential ports, respectively, the first and second ports defining a first pair of sequential ports, the second and third ports defining a second pair of sequential ports, each port in each pair of sequential ports being disposed on opposite sides of a line extending along the optical axis of the lens.

21. An optical circulator as defined in claim 20, wherein the ports each include a fibre having a mode field expanded core.

* * * * *